Patented June 14, 1932

1,863,451

UNITED STATES PATENT OFFICE

DON KYLE PROFFITT AND JOEL GEORGE SHARRON, OF DENVER, COLORADO, ASSIGNORS, BY MESNE ASSIGNMENTS, TO ETHYL GASOLINE CORPORATION, A CORPORATION OF DELAWARE

MANUFACTURE OF ALKYL METAL COMPOUNDS

No Drawing.   Application filed August 12, 1926. Serial No. 128,910.

This invention relates to the use of a hydroiodide of an aromatic amine as a catalyzer in the Grignard process.

The recent development in this art has necessitated the employment of better methods of producing the lead alkyls and related compounds. But prior art processes, even those of recent suggestion, have failed to prove satisfactory, due to the many difficulties involved in the manufacture of these compounds.

Among the objects and advantages of the present application will be found a process of manufacturing the lead alkyls and related compounds, particularly tetra ethyl lead, which eliminates many of the difficulties experienced in prior art processes.

In the development of a process for the manufacture of tetra ethyl lead or other alkyl metallic compounds, it has been found that the addition of a hydro-iodide of an iodine substitution product of an aromatic amine, when added in small quantities, tends to increase the yield of the reaction; also that it hastens the initial Grignard reaction, and tends to give a more uniform reaction throughout the remainder of the process.

Other objects and advantages will appear from the more detailed description set forth below, it being understood in this connection that such detailed description is given by way of example, and not by way of limitation, since various changes may be made therein by those skilled in the art, without departing from the spirit and scope of this invention.

The following specific example illustrates the method of using the catalyzer in carrying out this reaction: In the manufacture of tetra ethyl lead, magnesium metal shavings, or magnesium in other suitable form, are put into a container, together with ether, and a small quantity of hydro-iodide of dimethylaniline is added, together with a small quantity of iodine, and to this mixture ethyl bromide is slowly added until the reaction is complete, after which lead chloride is added slowly in quantity sufficient to utilize all the magnesium ethyl bromide which has been formed by the previous reaction; water is then added, and the resulting products are tetra ethyl lead, magnesium halide and lead.

The presence of the catalyst increases the yield, hastens the reaction, and gives more uniform reaction throughout the remainder of the process.

While the specific example given above suggests the use as a catalyst of hydro-iodides of dimethylaniline, hydro-iodides of other aromatic amines may be used. For example, hydro-iodides of the following substances will serve as catalyzers in the herein disclosed processes: hydroiodides of diphenylamine; phenylbenzylamine, diaminodiphenylmethane; diaminotriphenylmethane, diiodoxyaniline; iodoxydiphenylamine; iodoxyphenylbenzylamine; iodoxydiaminodiphenylmethane, and iodoxydiaminotriphenylmethane.

The presence of iodine either added or given off or by the decomposition of any of the foregoing catalysts does not decrease the efficiency of the catalyst.

And further, while the process has been illustrated by a method of making lead alkyl, these catalysts may be used advantageously in any Grignard reaction.

The following formula for the hydroiodide of iodoxydimethylaniline is given:

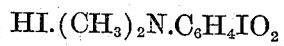

$$HI.(CH_3)_2N.C_6H_4IO_2$$

Having thus set forth our invention, we claim:

1. In the process of carrying on the Grignard reaction, the step of carrying out the reaction in the presence of a hydro-iodide of an aromatic amine as a catalyst.

2. In the process of carrying on the Grignard reaction, the step of carrying out the reaction in the presence of a hydro-iodide of an iodine substitution product of an aromatic amine as a catalyst.

3. In the process of carrying on the Grignard reaction, the step of carrying out the reaction in the presence of hydro-iodide of dimethylaniline as a catalyst.

4. In the process of making alkyl metal compounds by the Grignard reaction, the step of carrying out the reaction in the presence of a hydro-iodide of an iodine substitution product of an aromatic amine as a catalyst.

5. In the process of making alkyl metal compounds by the Grignard reaction, the step of carrying out the reaction in the presence of an iodine substitution product of an aromatic amine as a catalyst.

6. In the process of making alkyl metal compounds by the Grignard reaction, the step of carrying out the reaction in the presence of hydro-iodide of dimethylaniline as a catalyst.

7. In the process for the manufacture of tetra ethyl lead, the step of carrying out the reaction in the presence of a hydro-iodide of an iodine substitution product of an aromatic amine as a catalyst.

8. In the process for the manufacture of tetra ethyl lead, the step of carrying out a Grignard reaction for the preparation of tetra ethyl lead in the presence of hydro-iodide of dimethylaniline as a catalyst.

9. In the process for the manufacture of tetra ethyl lead by the Grignard reaction, the step of carrying out the reaction in the presence of hydro-iodide of iodoxy-dimethylaniline as a catalyst.

10. The process of making tetra ethyl lead which comprises reacting magnesium ethyl bromide with lead chloride in the presence of hydro-iodide of iodoxy-dimethylaniline and iodine.

DON KYLE PROFFITT.
   JOEL GEORGE SHARRON.